Figure 1:
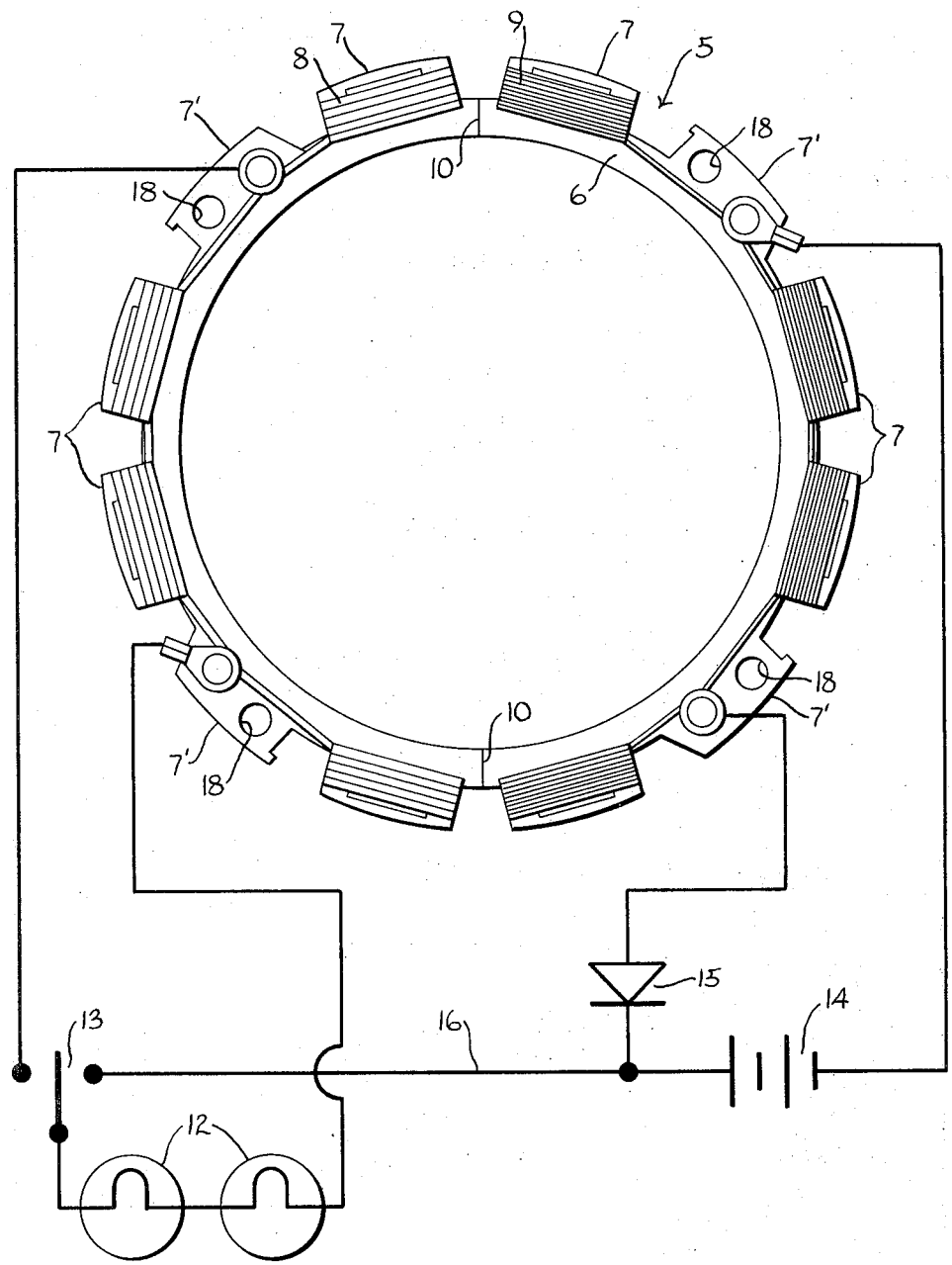

United States Patent [19]
Tharman

[11] 3,824,682
[45] July 23, 1974

[54] METHOD OF MASS PRODUCING ALTERNATOR STATORS FOR SMALL ENGINES

[75] Inventor: Paul A. Tharman, Milwaukee, Wis.

[73] Assignee: Briggs & Stratton Corporation, Wauwatose, Wis.

[22] Filed: July 26, 1973

[21] Appl. No.: 382,700

[52] U.S. Cl............... 29/596, 29/605, 310/42, 310/153, 310/216, 310/254
[51] Int. Cl. ........................................ H02k 15/02
[58] Field of Search...... 29/596, 605; 310/216, 254, 310/255, 42, 153, 154, 155, 193

[56] References Cited
UNITED STATES PATENTS

| | | | |
|---|---|---|---|
| 416,240 | 12/1889 | Schmid | 310/42 X |
| 505,783 | 9/1893 | Ashley | 310/254 X |

Primary Examiner—Charles W. Lanham
Assistant Examiner—Carl E. Hall

[57] ABSTRACT

A plurality of stator core rings are produced, each having circumferentially spaced pole teeth arranged symmetrically to a diametral plane. Certain of the rings are wound with two like sets of windings of wire of one gage, each set confined to its own side of said plane. The remaining rings are similarly wound, but with wire of a different gage. Every ring is then severed on its said diametral plane, thus forming stator elements of two kinds that can be assembled to engines singly or in pairs, as needed.

2 Claims, 2 Drawing Figures

METHOD OF MASS PRODUCING ALTERNATOR STATORS FOR SMALL ENGINES

This invention relates to the mass production of alternators intended for installation on small gasoline engines, and the invention is more particularly concerned with the volume production of alternator stators, each intended to be fixed to the crankcase portion of a small engine for cooperation with a permanent magnet carried by its flywheel.

Machines such as garden tractors and riding lawn mowers that are powered by small gasoline engines are, to an increasing extent, equipped with auxiliary electrical systems for energizing such accessories as headlights, engine starters and electric clutches. Since compactness, low cost and extreme sturdiness and durability are essentials of such equipment, the primal current source for the electrical apparatus is usually an altenator driven by the engine.

In one arrangement that has proven to be both successful and popular, the alternator comprises an annular core, formed of a stack of identical laminations and having circumferentially spaced pole teeth around which coils of wire are wound. The stator is fixed to the crankcase portion of the engine, in proximity to the flywheel and coaxial with it, so that a permanent magnet alternator is carried by the flywheel for orbital motion can pass in flux-linking relation to the pole teeth of the stator to induce alternating current in the windings.

With this arrangement the stator has two separate sets of windings, one for an a.c. load circuit, the other for battery charging. The set of windings for the a.c. load circuit is of relatively heavy wire and is connectable directly with lights and the like for energizing them with unrectified a.c. The other set of windings is connected with a storage battery through a half-wave rectifier and is so designed that the current through it is limited to a small enough value to insure against overcharging of the battery, thereby making a regulator unnecessary.

In the altenrator stator just described, the two sets of windings are at diametrically opposite sides of the stator, and they have been wound on the core simultaneously by means of a more or less conventional machine having two winding flyers. Although there was no particular problem in operating the winding machine with wires of two different gages, nor in making it wind different numbers of turns on the respective sets of coils, there was some inefficiency in its operation inasmuch as its flyer that wound the coils having the lesser number of turns had to be idle while the other flyer finished winding the other set of coils.

A more serious and costly inefficiency resulted from the desire to satisfy all customer preferences. Some customers desire engines equipped with stators on which only the heavier gage coils are wound, to be used for machines that are equipped with lights but have no battery. Others want their engines to have stators with only the lighter gage windings, for powering machines that have batteries but no a.c. loads. Still others want stators that are wound with both types of windings, for machines having both a battery and an a.c. load circuit. To satisfy all of these desires it was necessary to manufacture and stock all three types of stators. Furthermore, those customers who wanted only one type of winding on their stators received a certain amount of core metal that they did not actually need.

By contrast, the present invention has as its general object to provide a method of mass producing alternator stators of the character described whereby increased efficiency and economy is achieved in several respects as compared with the prior practice, and, which, in particular, improves the efficiency of winding machine operation, reduces from three to two the number of different types of stators that must be stocked to meet all customer requirements, materially reduces the bulk of stators not yet installed on engines, and eliminates the inclusion of unnecessary core metal in stators having only one set of windings.

It is a more specific object of this invention to reduce the cost of repairing an alternator of the character described, in the event an ultimate consumer finds that stator replacement is necessary.

It is also a specific object of this invention to reduce the cost of manufacturing, stocking and handling alternator stators having two sets of windings, one for a.c. load energization and one for unregulated battery charging.

Another object of this invention is to provide an inexpensive method of mass producing very versatile stator elements which are capable of being installed on engines either singly or in any of a number of different combinations and which are thus capable of meeting economically a large variety of customer requirements.

With these observations and objectives in mind, the manner in which the invention achieves its purpose will be appreciated from the following description and the accompanying drawings, which exemplify the invention, it being understood that changes may be made in the precise method of practicing the invention that is disclosed herein without departing from the essentials of the invention set forth in the appended claims.

Figure 2:
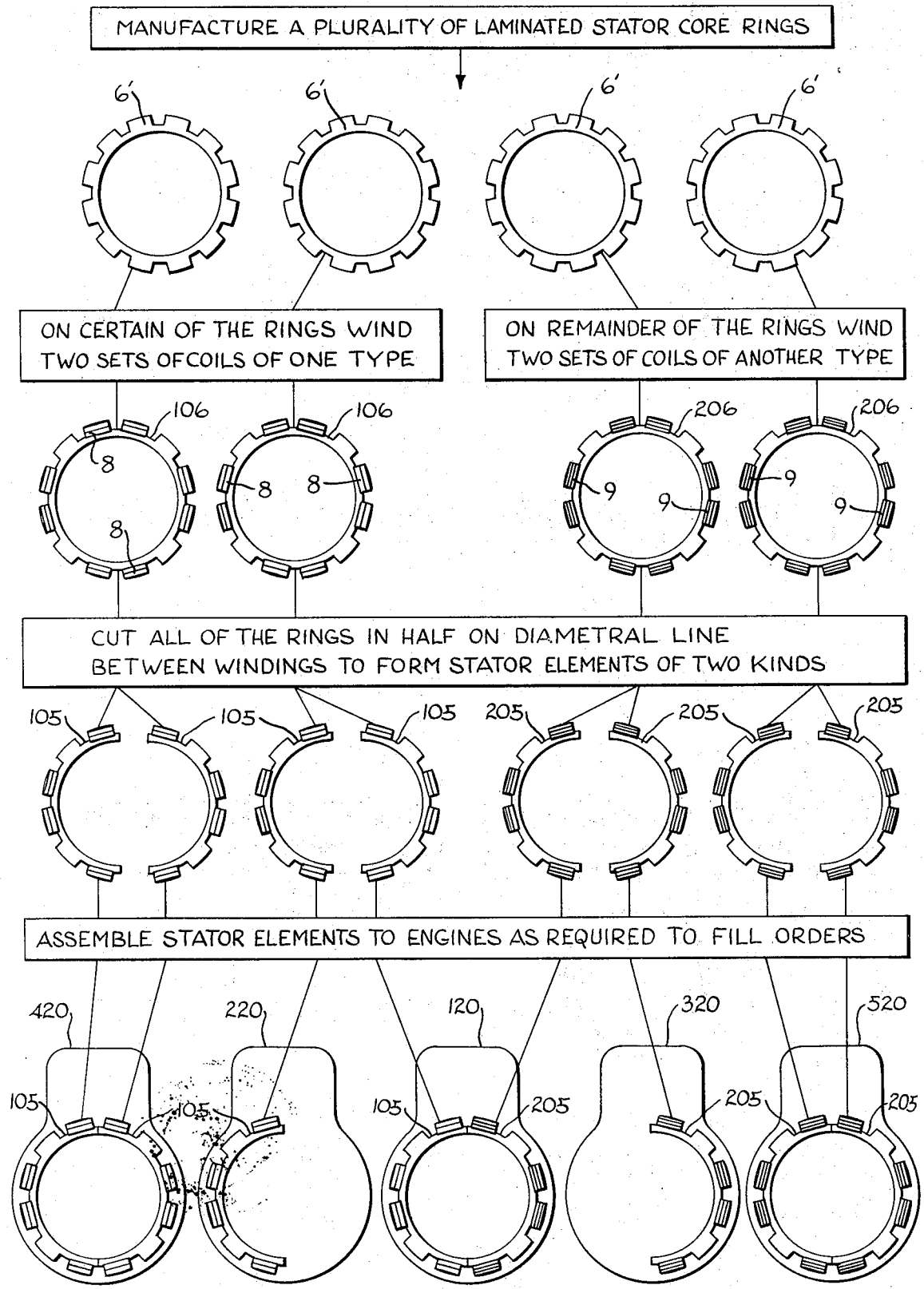

The accompanying drawings illustrate one complete example of an embodiment of the invention practiced according to the best mode so far devised for the practical application of the principles thereof, and in which:

FIG. 1 is a plan view of an alternator stator made in accordance with the method of this invention, intended for use in an electrical system having both an a.c. load circuit and an unregulated battery charging circuit, said circuits being illustrated diagrammatically; and FIG. 2 is a somewhat pictorialized block diagram of the steps in the mass production method of this invention, with simplified depictions of those structures that are illustrated.

Referring now to the accompanying drawings, the numeral 5 designates generally an alternator stator which has been manufactured in accordance with the principles of this invention and which comprises, in general, an annular core 6 having radially outwardly projecting pole teeth 7 at substantially uniform intervals around its periphery, and two sets of windings, respectively designated 8 and 9, which are wound around the pole teeth. The stator 5 is intended to be mounted on the body of a small engine, adjacent to its flywheel and coaxial therewith, so that as the flywheel rotates a permanent magnet that is carried by it charges into the pole teeth 7 a varying flux that induces an alternating current in each of the winding sets 8 and 9. For simplicity, the engine, its flywheel and the magnet are not illustrated, these being well known.

It will be understood that the core 6 is made up of stacked identical laminations, as is conventional, but in this case the core has a novel feature in that it is made in two halves, divided from one another along a diametral line indicated at 10; but these two halves are so juxtaposed as to be the functional equivalent of an integral annular core. Each of the sets of windings 8 and 9 is wound around the pole teeth 7 of one core half.

The winding set 8 is wound of a heavier gage wire than the set 9 and has a lesser number of turns. Thus the a.c. induced in the winding set 8 is suitable to be applied directly to the energization of headlights 12. A switch 13 in the circuit comprising the winding set 8 and headlights 12 enables the lights to be turned on and off.

The winding set 9 is connected in series with a storage battery 14 and a diode 15 that provides for half-wave rectification. It will be understood that the parameters of winding 8 are such that there is no tendency for the battery to be overcharged even though there is no regulator in the circuit. To enable the headlights to be energized from the battery at times when the engine is not running, the switch 13 can be a double-throw switch with a central "off" position, as shown, and can have one of its stationary contacts connected with the battery by means of a conductor 16.

The stator core 6 as a whole is symmetrical to the line of division 10, so that the two core halves are identical to one another, and each of the winding sets 8 and 9 is confined to its own half of the core. Therefore if the stator is to be installed in a system that provides only a.c. light energization, the core half comprising the winding set 9 can be omitted; and, similarly, for an electrical system that provides only for battery charging, only the core half having the winding set 9 need be used. Note that two of the pole teeth of each core half, designated by 7', located symmetrically with respect to the core half, have no windings around them but instead have holes 18 through them to receive bolts (not shown) or the like by which the core half can be secured to an engine body.

The method of mass producing stators according to the principles of this invention starts with the production of a plurality of annular stator core rings 6' which can be identical with the laminated stator 6 illustrated in FIG. 1 except that they are not divided into halves but are complete, integral annuli.

On certain of these stator core rings 106 two sets of the windings 8 are wound. Note that the two windings 8 on each of such rings are to be identical to one another, and that each of such winding sets will be confined to one side of the plane of symmetry of the ring that is defined by the line 10 in FIG. 1. Because these two windings are identical, they can be efficiently wound simultaneously on two-flyer winding machine that has its flyers moving in unison, without the need for either flyer to be idle while the other completes its winding cycle.

In like manner each of the remaining core rings 206 has wound on it two of the winding sets of the other type, corresponding to the winding 9 in FIG. 1. Again, each of these winding sets 9 is confined to its own half of the core ring so that the wound ring is symmetrical to a plane corresponding to the line 10 in FIG. 1.

When the windings are finished, all of the core rings 106 and 206 are cut in half on the diametral plane through each that corresponds to the line 10 in FIG. 1. Such severing can be effected in any expeditious manner, as by shearing or sawing. The conventional coating of the windings with epoxy or the like is preferably accomplished before the severing operation, but is can be performed afterward.

The severing of the several core rings produces a supply of stator elements 105 and 205 of two kinds, one kind (denoted by 105) having windings of the type corresponding to the winding 8 in FIG. 1, the other (denoted by 205) having windings like the winding 9. Such stator elements can be assembled to engines as necessary to meet customer desires, in any of several different arrangements.

Thus, for a customer who builds engine powered machines with both headlight and battery circuits, one of each of the stator elements 105 and 205 will be installed on each engine 120, to provide an annular stator like that illustrated in FIG. 1. Only a stator element 105 will be installed on each engine 220 for a customer who desires only an unrectified a.c. power source, and only a stator 205 will be installed on each engine 320 for a customer who wants only a source of battery charging current.

However, the manufacture of the stator elements 105 and 205 makes it possible to satisfy other customer requirements that could not heretofore be met economically. For example, if a customer requires no battery charging capability but wants rather powerful headlight energization, as on an engine intended for a snowmobile, each engine 420 for that customer can be equipped with two of the stator elements 105, both of them connectable with the headlight circuit, either in series or in parallel in accordance with the type of lights to be used. In like manner, if a customer wishes to have heavy duty battery charging capability but has no need for an unrectified a.c. source, each engine 520 for such customer can be equipped with two of the stator elements 205.

Note that the half-annular stator elements 105 and 205 are much more compact than complete annuli of corresponding dimensions and can therefore be stored, packaged and shipped at much less cost than the prior full ring stators that they supersede. It is also noteworthy that a customer who requires only one type of electrical output obtains it with a stator that has no unnecessary core metal.

One final advantage of the invention is worth mentioning because it inures directly to the ultimate consumer, even though he may never have occasion to experience it. Alternator stators seldom fail or become damaged in service; but when this does happen with a stator having two windings, it is almost invariably only one of the windings that becomes defective. With stators manufactured in accordance with the principles of the present invention, the consumer need only purchase a stator element to replace the one having the defective winding, instead of being compelled, as formerly, to purchase at substantially greater expense an entire core ring and two windings.

From the foregoing description taken with the accompanying drawings it will be apparent that this invention provides a method of mass producing alternator stators for small gasoline engines whereby substantially conventional stators of various types can be manufactured efficiently and in a manner that achieves economy not only in manufacturing but also in storage, shipping, inventory and repair.

Those skilled in the art will appreciate that the invention can be embodied in forms other than as herein disclosed for purposes of illustration.

The invention is defined by the following claims:

1. The method of mass producing alternator stators intended to be installed on small engines for cooperation with permanent magnets carried by their flywheels, to enable certain of such engines to be equipped with a type of alternating current source suitable for powering load circuits such as headlights, others to be equipped with a type of alternating current source suitable, when rectified, for unregulated battery charging, and still others to be equipped with both types of alternating current sources, said method being characterized by:

A. manufacturing a plurality of identical substantially annular stator core rings, each having an even number of circumferentially spaced pole teeth and being symmetrical to a diametral line;

B. winding on the pole teeth of each of a certain number of said rings two sets of windings of wire of one gage, said sets of windings being at opposite sides of said diametral line, each being wholly at its side of said line, and the two sets being identical to one another;

C. similarly winding on each of the remainder of said rings two identical sets of windings of wire of another gage; and D. cutting all of said stator rings in half on said diametral line.

2. The method of mass producing alternator stators for small engines for cooperation with permanent magnets carried by their flywheels and each of which stators comprises an annular core having a plurality of circumferentially spaced pole teeth, a set of windings of a first type, wound around pole teeth at one side of the core and adapted to have induced in it a current suitable for energizing an a.c. load such as a light circuit, and a set of windings of a second type, wound around pole teeth at the diametrically opposite side of the core and adapted to have induced in it a current which, when rectified, is suitable for unregulated battery charging, said method being characterized by:

A. winding on each of a first plurality of annular core rings two sets of windings of said first type, at diametrically opposite sides of the ring, each set of windings being confined to its own side of the ring;

B. similarly winding on each of a second plurality of annular core rings two sets of windings of said second type;

C. cutting all of said annular core rings in half, each on a diametral line lying between the sets of windings thereon, so that each half of a core ring contains a complete set of windings; and D. assembling to each engine one wound ring half of said first plurality and one wound ring half of said second plurality.

\* \* \* \* \*

UNITED STATES PATENT OFFICE
CERTIFICATE OF CORRECTION

Patent No. 3,824,682          Dated  July 23, 1974

Inventor(s)  Paul A. Tharman

It is certified that error appears in the above-identified patent and that said Letters Patent are hereby corrected as shown below:

Col. 1, Line 27, Delete "alternator" and insert --which--

Col. 1, Line 43, "altenrator" should read --alternator--

Col. 3, Line 58, before "two-flyer" insert --a--

Col. 4, Line  7, "is" should read --it--

Signed and sealed this 5th day of November 1974.

(SEAL)
Attest:

McCOY M. GIBSON JR.  
Attesting Officer

C. MARSHALL DANN  
Commissioner of Patents